(12) United States Patent
Hendel

(10) Patent No.: US 12,167,015 B2
(45) Date of Patent: Dec. 10, 2024

(54) JPEG CLASSIFIER

(71) Applicant: DSP Group Ltd., Herzelia (IL)

(72) Inventor: Tal Hendel, Tel Aviv (IL)

(73) Assignee: DSP Group Ltd. (IL)

(*) Notice: Subject to any disclaimer, the term of this patent is extended or adjusted under 35 U.S.C. 154(b) by 287 days.

(21) Appl. No.: 17/164,938

(22) Filed: Feb. 2, 2021

(65) Prior Publication Data

US 2021/0241024 A1 Aug. 5, 2021

Related U.S. Application Data

(60) Provisional application No. 62/969,097, filed on Feb. 2, 2020.

(51) Int. Cl.
| | |
|---|---|
| *G06V 10/764* | (2022.01) |
| *G06V 10/50* | (2022.01) |
| *G06V 10/774* | (2022.01) |
| *G06V 10/80* | (2022.01) |
| *G06V 20/80* | (2022.01) |
| *G06V 30/19* | (2022.01) |
| *H04N 19/48* | (2014.01) |
| *G06V 30/24* | (2022.01) |

(52) U.S. Cl.
CPC ............ *H04N 19/48* (2014.11); *G06V 10/50* (2022.01); *G06V 10/764* (2022.01); *G06V 10/774* (2022.01); *G06V 10/806* (2022.01); *G06V 20/80* (2022.01); *G06V 30/19173* (2022.01); *G06V 30/2504* (2022.01)

(58) Field of Classification Search
None
See application file for complete search history.

(56) References Cited

U.S. PATENT DOCUMENTS

| | | | |
|---|---|---|---|
| 10,984,560 B1* | 4/2021 | Appalaraju | G06V 10/82 |
| 2009/0263035 A1* | 10/2009 | Li | H04N 19/85 |
| | | | 382/250 |
| 2010/0027686 A1* | 2/2010 | Zuo | H04N 19/46 |
| | | | 382/233 |
| 2019/0244394 A1* | 8/2019 | Gueguen | G06T 9/002 |

FOREIGN PATENT DOCUMENTS

CN 108881923 A * 11/2018 ........... H04N 19/433

* cited by examiner

*Primary Examiner* — Bernard Krasnic
(74) *Attorney, Agent, or Firm* — Paradice & Li LLP

(57) ABSTRACT

A method, device and computer program product, the method comprising: obtaining access to a classifier trained upon a multiplicity of sets of decoded coefficients; obtaining a set of block coefficients associated with at least a part of the compressed image; and applying the classifier to the set of block coefficients, to obtain a classification of the compressed image.

12 Claims, 5 Drawing Sheets

JPEG CLASSIFIER

CROSS-REFERENCE TO RELATED APPLICATION

This application claims priority and benefit under 35 U.S.C. § 119(e) to U.S. Provisional Patent Application No. 62/969,097, filed Feb. 2, 2020, which is incorporated herein by reference in its entirety.

FIELD

The present disclosure relates to classifying images in general, and to efficiently classifying compressed images, in particular.

BACKGROUND

Image classification generally refers to associating an image with one or more classes from a multiplicity of classes according to its visual content. For example, an image can be classified as "containing a human face or "not containing a human face"; "containing a dog" or "containing a car" or "containing a traffic light"; discriminating between "a person is crossing the road" and "no person is crossing the road", or the like.

Computerized image classification is becoming more and more important, for a variety of purposes. For example, image classification may be used in security systems for recognizing whether a person is captured, after which further identification may be performed to allow or forbid access to a location or a device.

Large numbers of classified images are also required for training faster, more efficient, more accurate or otherwise more advanced classification algorithms (also known as classifiers or classification engines).

Image classification generally comprises extraction of features from the image, followed by application of a classifier to the extracted feature vectors for classifying the feature vectors into one of predetermined classes. Both stages are computationally heavy processes. The need for such computerized image classification exists across the spectrum of computer platforms, from large server farms to miniature, battery operated systems.

SUMMARY

One exemplary embodiment of the disclosed subject matter is a method for classifying a compressed image, comprising: obtaining access to a classifier trained upon a multiplicity of sets of decoded coefficients; obtaining a set of block coefficients associated with at least a part of the compressed image; and applying the classifier to the set of block coefficients, to obtain a classification of the compressed image. Within the method, the set of block coefficients is optionally received from a capture device configured for: compressing an image to determine the block coefficients for a captured image; and outputting at least a part of the block coefficients no later than the image is fully compressed. Within the method, the set of block coefficients is optionally obtained by: obtaining a compressed image, comprising decoded block coefficients of an original image; and partially decompressing the compressed image to obtain the decoded block coefficients as the set of block coefficients. Within the method, partially decompressing the compressed image and applying the classifier to the block coefficients optionally takes at most 50% of the processing steps required for full decompression and classification of the compressed image. Within the method, partially decompressing the compressed image and applying the classifier to the block coefficients optionally takes at most 10% of the processing steps required for full decompression and classification of the compressed image. Within the method, partially decompressing the compressed image and applying the classifier to the quantized block coefficients is performed in hardware. The method can further comprise: obtaining from the classifier a probability of the classification; and subject to the probability exceeding a predetermined threshold, performing full classification of the compressed image. Within the method, performing the full classification optionally comprises: fully decompressing the compressed image to obtain a second set of block coefficients; de-quantizing the second set of block coefficients, to obtain de-quantized coefficients; inverse transforming the de-quantized coefficients to obtain pixel values of the original image; extracting feature vectors form the original image; and classifying the original image using the feature vectors. Within the method, applying the classifier to the set of block coefficients optionally comprises: combining the set of block coefficients in a first predetermined block combination to obtain first combined block coefficients, and wherein the classifier is applied to the first combined block coefficients; and further comprising: obtaining a first classification probability from applying the classifier on the combined block coefficients; combining the set of block coefficients in a second predetermined block combination to obtain second combined block coefficients; applying the classifier to the second combined block coefficients, to obtain a classification of the compressed image and a second probability; and performing the full classification of the compressed image, subject to the maximum between the first probability and the second probability exceeding the predetermined threshold. Within the method, the first predetermined block combination and the second predetermined block combination are optionally in accordance with expected characteristics of the original image. Within the method, performing the full classification optionally comprises: fully decompressing the compressed image to obtain a second set of block coefficients; de-quantizing the second set of block coefficients, to obtain de-quantized coefficients; inverse transforming the de-quantized coefficients to obtain pixel values of the original image; extracting feature vectors from the original image; and classifying the original image using the feature vectors. The method is optionally used for security or privacy protection purposes. Within the method, the compressed image is optionally a Joint Photographic Experts Group (JPEG) image.

Another exemplary embodiment of the disclosed subject matter is a device comprising: an image capture device for capturing a captured image; a memory device for storing a compressed image being the captured image as compressed, the compressed image comprising a set of block coefficients; and a processor, executing: obtaining access to a classifier trained upon a multiplicity of sets of decoded coefficients; obtaining a set of block coefficients associated with at least a part of the compressed image; and applying the classifier to the set of block coefficients, to obtain a classification of the compressed image. Within the device, the set of block coefficients is optionally received from a capture device configured for: compressing an image to determine the block coefficients for a captured image; and outputting at least a part of the block coefficients no later than the image is compressed. Within the device, the set of block coefficients is optionally obtained by: obtaining a compressed image, comprising decoded block coefficients of an original image; and partially decompressing the compressed image to obtain the decoded block coefficients as the set of block coefficients. Within the device, partially decompressing the compressed image and applying the classifier to the block coefficients optionally takes at most 10% of the processing steps required for full decompression and classification of the compressed image. Within the device, applying the classifier to the set of block coefficients optionally comprises: combining the set of block coefficients in a first predetermined block combination to obtain first combined block coefficients, and wherein the classifier is applied to the first combined block coefficients; and further comprising: obtaining a first classification probability from applying the classifier on the combined block coefficients; combining the set of block coefficients in a second predetermined block combination to obtain second combined block coefficients; applying the classifier to the second combined block coefficients, to obtain a classification of the compressed image and a second probability; and performing the full classification of the compressed image, subject to the maximum between the first probability and the second probability exceeding the predetermined threshold. Within the device, the compressed image is optionally a Joint Photographic Experts Group (JPEG) image.

Yet another exemplary embodiment of the disclosed subject matter is a computer program product comprising a non-transitory computer readable storage medium retaining program instructions, which program instructions when read by a processor, cause the processor to perform a method comprising: obtaining access to a classifier trained upon a multiplicity of sets of decoded coefficients; obtaining a set of block coefficients associated with at least a part of the compressed image; and applying the classifier to the set of block coefficients, to obtain a classification of the compressed image.

BRIEF DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
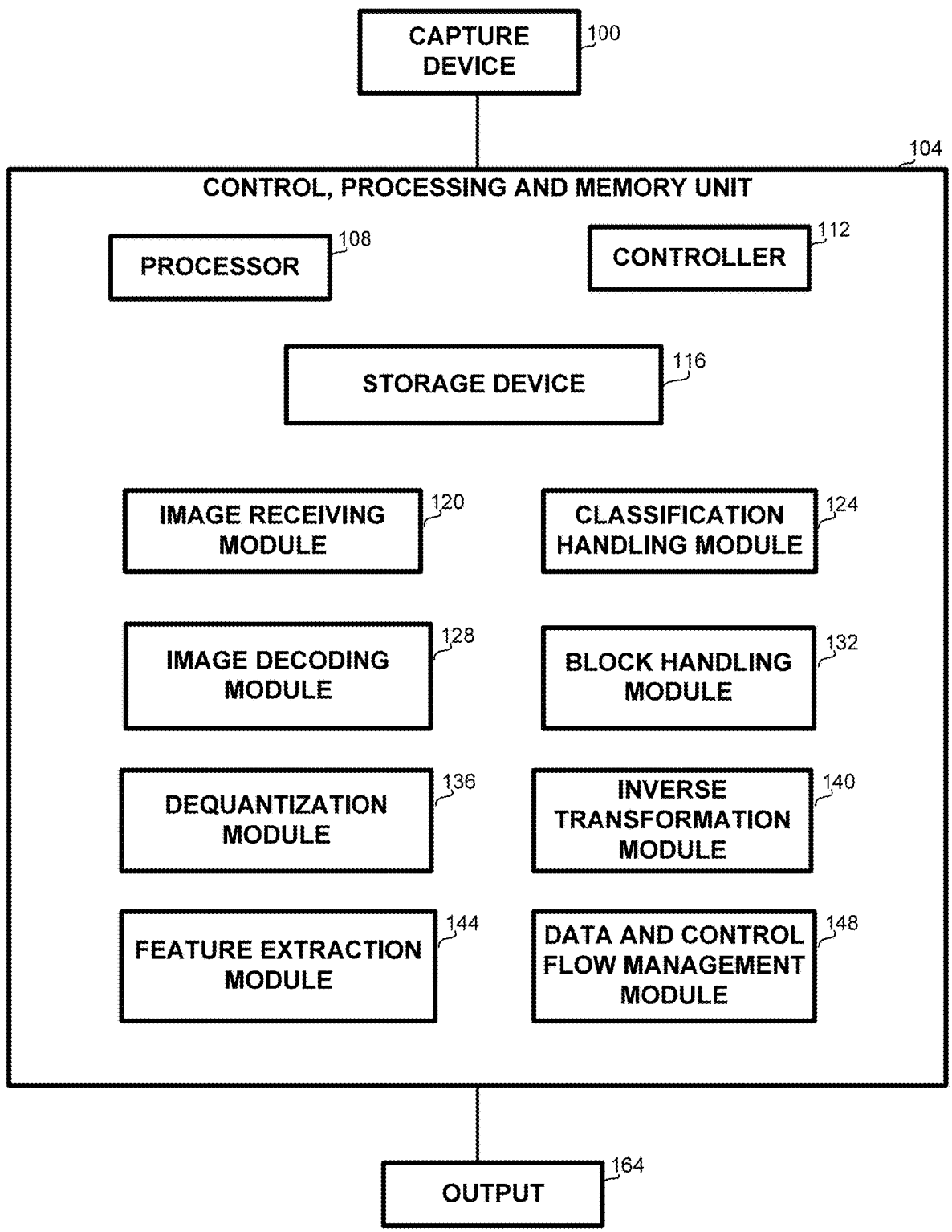
FIG. 1A is a generalized block diagram of a capture and processing device, in accordance with some exemplary embodiments of the disclosed subject matter.

Image classification is a common task, used in a wide variety of applications. Images may be classified for performing a particular task, such as recognizing a person, analyzing the content of an image, or the like. Images may also be classified for the purpose of training further classification engines, for example for achieving more accurate classification. In some embodiments, classification may be into three or more classes. In other embodiments, classification may be into two classes, wherein the classification may be interpreted as a choice, for example "does the image depict a male or a female". However, the classification may also be interpreted as a yes/no question, for example "is a human face depicted", "does John appear in the image?", or the like. In the description below, unless indicated otherwise, the classifier may be interpreted as answering such yes/no question, optionally providing a numerical probability of the answer being "yes", for example "the image depicts a human face" with probability of 65%, means that there is a 65% probability that the image depicts a human face.

A common exemplary usage of image classification relates to security and privacy—identifying that a human being, or specifically a full human body or a part thereof (e.g., a head or a face) is captured, possibly followed by identification of the person, however, other common usages exist, for example retrieving all video sequences containing a predetermined landmark, such as the Eiffel tower, from a video database.

Some devices, and in particular devices that analyze images, whether the devices comprise a capture device or not, need to be operable with as low power consumption as possible, for example operable independently, on batteries, without cables.

Some devices that comprise a capture device may also comprise a processing device, and interface for performing a specific action, such as enabling access to a location or a device. Many such devices do not use the raw image coming from the sensor of the capture device, as the latter is too big to transmit efficiently, but rather receive a compressed version of the image which they then decompress. Currently, determining whether a compressed image contains an object of interest (e.g., a person, a face, a pet, or a car) requires full decompression followed by feature extraction, object search and classification, all of which are highly costly in terms of computation and battery power. In addition, in security and privacy systems, only a fraction of the captured images indeed contains such objects.

Thus, one technical problem of the disclosure relates to providing a method and apparatus for efficiently determining whether an object of interest is captured in a compressed image.

The term "block" used in this disclosure is to be widely construed to cover any rectangular block of pixels from an image, for example 16×16 pixels, 32×32 pixels, 48*56 pixels, or the like, as used by the JPEG algorithm for compression. The current disclosure may be applicable to one block, multiple blocks, or the entire image, as further described below.

One technical solution of the disclosure is an apparatus and method for efficiently classifying compressed images, without first having to fully decompress the image followed by extracting features from the decompressed image, two computationally expensive procedures.

Thus, partial decompression may be performed by decoding the image to obtain the quantized coefficients. As further detailed below, the term "decoding" refers to an initial step of decompression, which retrieves the quantized coefficients of each block of the image. The quantized coefficients, many of which are often zero because of the compression process, may then be provided to a rough classifier, trained to recognize objects based upon such quantized coefficients, while avoiding the costly processes of full decompression and feature extraction from the decompressed image. Thus, images may be efficiently roughly classified. If the rough classifier indicates than an object of interest may be included in the image, the image may then undergo full decompression, followed by regular feature extraction and classification of the extracted feature vectors, to validate the rough classification and obtain precise localization of the object contained in the image.

Another technical solution of the disclosure is that such classification may be rough, meaning that a substantial rate of false positives (relative to a predetermieed threshold) is allowed. Thus, some presentage, for example 10% of the images may require further scrutiny, where a smaller percentage actually contain the object of interest. The solution thus requires, for example, efficiently determining only whether an object of interest may be captured in the image, to some degree of confidence, and not enabling high confidence or full identification or precise localization of the object.

In addition, often, only a small fraction of the captured images indeed includes an object of interest. Thus, such rough classification may be efficiently performed over all captured images, and only in those cases in which the image is classified as containing the required object, full decompression and classification may be performed. An important requirement from such a rough classifier is that, to a high degree of certainty, it rules out correctly images that do not contain the target object, also referred to as low false negative rate.

Yet another technical solution of the disclosure is the utilization of a capture device which includes a compression device, and a corresponding method. The capture device may include a compression unit, implemented in hardware, software, firmware or the like, for compressing an image, for example using a JPEG compression, that also outputs the interim compression characteristics, for example the JPEG coefficients, making them available for purposes such as classification. Thus, a processor may receive the coefficients before, or even instead of the compressed image, and may classify the coefficients to recognize objects based upon such quantized coefficients, while avoiding full decompression and feature extraction of the image. Such capture device and method may provide for analyzing large images with limited memory resources.

One technical effect of the disclosure relates to efficient rough classification of an image, to determine, for example, whether the image could contain an object of interest or not. Since in many devices, for example in "always on" devices, most of the time no object is captured, this rough classification enables continuous operation of the device while consuming relatively little resources. The classification of the image in accordance with the disclosure may take a fraction, for example up to 50%, up to 10%, up to 5% or the like, from the computational steps it takes to fully decompress the image and classify it. The rough classification, that is performed in addition to the full classification when the rough classification detects an object of interest, is negligible in resource consumption relatively to the full decompressions and classifications that have been avoided.

Referring now to FIG. 1, showing a schematic block diagram of a device employing efficient image classification.

The device comprises capture device 100, such as an interface to a video dataset, to an image dataset, to a camera, to a video camera, or the like. Capture device 100 may provide compressed images, such as JPEG images, or images compressed under a different scheme. Such scheme should provide: a) separately compressed images (e.g., in contrast with video compression schemes such as MPEG); b) the image is compressed in blocks rather than as one unit; and c) the scheme should output coefficients of the compressed image in each block. Although for efficient compression many of the coefficients tend to become zero after compression, this is not a requirement.

Capture device 100 may also be configured to output the compression coefficients, instead of or in addition to the compressed images.

The device may also comprise control, processing and memory unit (CPMU) 104. CPMU 104 may be implemented as one or more computing platforms. In some embodiments, CPMU 104 or components thereof may be embedded within capture device 100.

CPMU 104 may comprise one or more processors 108, such as one or more Central Processing Units (CPU), microprocessors, Graphical Processing Units (GPU)s, electronic circuits, Integrated Circuits (IC) or the like. Processor 108 may be configured to provide the required functionality, for example by loading to memory and executing the modules stored on storage device 116 detailed below.

It will be appreciated that CPMU 104 may be implemented as one or more computing platforms which may be in communication with one another. It will also be appreciated that processor 104 may be implemented as one or more processors, whether located on the same platform, collocated platforms, remote platforms, on a cloud computing device, or in any other manner.

CPMU 104 may comprise a controller 112 for controlling the input, for example setting operation parameters of the camera or of the processing, selecting the images or videos imported from a dataset, controlling the compression parameters of capture device 100, or other operations. Controller 112 may be implemented in hardware, software, firmware, or any combination thereof.

CPMU 104 may comprise a storage device 116, such as a hard disk drive, a Flash disk, a Random-Access Memory (RAM), a memory chip, or the like.

In some exemplary embodiments, storage device 116 may retain program code operative to cause processor 108 to perform acts associated with any of the modules listed below or steps of the methods of FIG. 2 or FIG. 3 below. The program code may comprise one or more executable units, such as functions, libraries, standalone programs or the like, adapted to execute instructions as detailed below. In alternative embodiments, the modules may be implemented as hardware, firmware or the like.

Image receiving module 120 may be operative in receiving and optionally storing one or more compressed images or parts thereof received from capture device 100.

Classification handling module 124 may be operative in obtaining a classifier, or obtaining access to a classifier via an Application Program Interface (API), whether the classifier itself is executed by CPMU 104 or by another computing platform, operatively connected to CPMU 104. Classification handling module 124 may thus enable classification of a feature vector. Classification handling module 124 may also enable training of a classifier in accordance with a collection of feature vectors for which classification is given. In alternative embodiments, the training and classification may be performed by different computing platforms. For example, training may be performed on a cloud computing platform, while classification may be performed by a local low-power device.

Image decoding module 128 may be operative in decoding the full image or only parts of an image, in accordance with predetermined parameters, such as a setting indicating in which blocks of the image the object is expected to be, for example a middle block of the image, a 2×1 area of blocks in the vicinity of the lower part of the image, 1×2 area, 2×2 area, 8×16 or any other combinations of specific blocks in various locations within the image according to the specific needs of the particular application.

Block handling module 132 may be operative in retrieving, using, changing or otherwise accessing the definition of the relevant blocks in which the object is expected to be found.

If decoding and rough classification identifies that an object may indeed have been captured, full decompression and classification may be required. Thus, storage device 116 may comprise modules for the full decompression and classification of images, including:

Image decoding module 128 discussed above, which decodes the quantized coefficients from the image;
Dequantization module 136;
Inverse-transformation module 140 for retrieving the original image values by inverse-transforming the data from transform-space to pixel-space;
Feature extraction module 144 for extracting features and feature vectors from the decompressed image.
In addition, classification handling module 124 may be useful in classifying the feature vectors, optionally using a different classifier than the rough classifier used for the determination of whether an object is captured.

Storage device 116 may comprise data and control flow management module 148, for managing the activation of the various modules at the required circumstances and with the required data, for example providing and activating the full decompression only if the partial decompression and classification indicated that an object has been captured, or the like.

Depending on whether the image was classified as including the object of interest or not, a signal may be sent to output 164, which may initiate a required action. For example, in response to positive identification, access may be granted; in response to identifying a captured object as being of the expected type but not recognized, for example a non-granted person, a preventive action may be taken; in response to negative identification of face, the screen luminosity can be decreased, or the like.

Figure 2A:
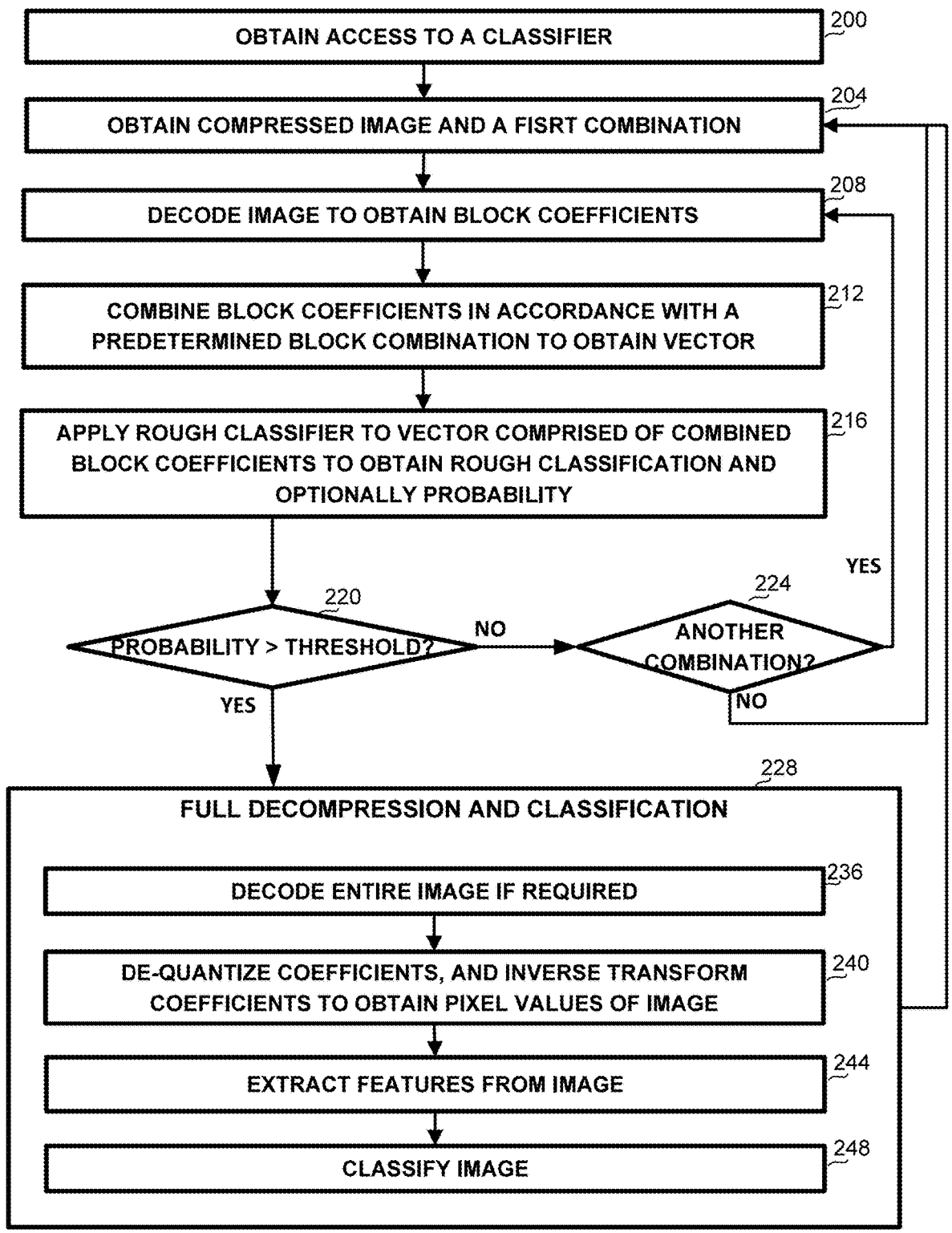
FIG. 2A is a generalized flowchart of a method for classifying compressed images, in accordance with some embodiments of the disclosure.

Referring now to FIG. 2, showing a flowchart of an embodiment of a method for efficient image classification. The steps of FIG. 2 may be performed by modules of FIG. 1. If the modules are implemented in software, they may be stored on storage device 116 and executed by processor 108 of CPMU 104.

On step 200, access may be obtained to one or more classifiers. Access may be enabled by directly invoking a classification executable, by calling an API of a classifier whether collocated on the same computing device or remotely, or the like. In some embodiments, access may be obtained to both a rough classifier and to a full classifier.

On step 204, a compressed image, such as a JPEG image, may be obtained by CPMU 104, for example from capture device 100. Optionally, a first block combination of the predetermined block combinations may be obtained as well, for example an area of 2×2 or 8×8 blocks located at the middle of the image.

On step 208, the received compressed image may be decoded, for example by image decoding module 128. The decoding may, in accordance with data retrieved from a header of the compressed image, process the whole image, only one specific block or a combination of specific blocks of the image. Decoding may obtain the coefficients of the relevant blocks.

On step 212, the block coefficients from one or more blocks may be combined, for example by concatenation, thus creating a feature vector.

On step 216, the rough classifier may be applied to the obtained vector, to obtain a rough classification and optionally a corresponding probability.

On step 220 it may be determined whether the probability exceeds a predetermined threshold, for example 50%, 70%, 90% or the like. If no probability is provided, it may be interpreted as a binary question with 100% or 0% probability, with a 50% threshold, for example whether the image depicts a human face.

If the probability exceeds the threshold, or the classifier returned a "yes" without a probability, execution may proceed to full decompression and classification 228.

If the probability is below the threshold, or the classifier returned a "no" without a probability, it may be determined on step 224 whether further block combinations are possible. It will be appreciated that dozens or even hundreds of such combinations may exist, in accordance with the image size and resolution.

If no further block combinations exist, it may be determined that the image does not depict the required object, and execution may continue at step 204 with a newly acquired image.

If another block combination exists, then execution may return to block 212 for combining further decoded blocks, followed by applying the classifier on the vector on step 216. If not all blocks have been decoded earlier, execution may return to step 208 for decoding the required blocks, followed by combining on step 212 and applying the classifier on step 216.

Thus, if the first or any other of the combinations has a probability exceeding the threshold, or the classifier returned a "yes" without a probability, execution may proceed to full decompression and classification 228.

Full decompression and classification 228 may start with step 236 for decoding the entire image, if required, e.g. if not all blocks have been decoded earlier.

Full decompression and classification may comprise step 240 for de-quantization of the coefficients, and inverse-transforming the de-quantized coefficients, thus obtaining the pixel values of the image.

Full decompression and classification may comprise step 244 of extracting the required features from the image and combining them into feature vectors.

Full decompression and classification 228 may comprise step 248 of applying a full classifier to the feature vectors, for determining in a more accurate manner whether the required object is depicted in the image. Full decompression and classification 228 may apply to the analyzed combination of blocks only, or to the entire image.

Upon the classifier reaching its final classification result, the result may be output, for example to a device that grants access to a device or location, to an alarm system, to a camera that may take a high quality image of the person trying to access the device or location, to a storage device, e.g., for training further classifiers, or to any other device.

Execution may then return to step 204 for handling a newly acquired image.

Figure 2B:
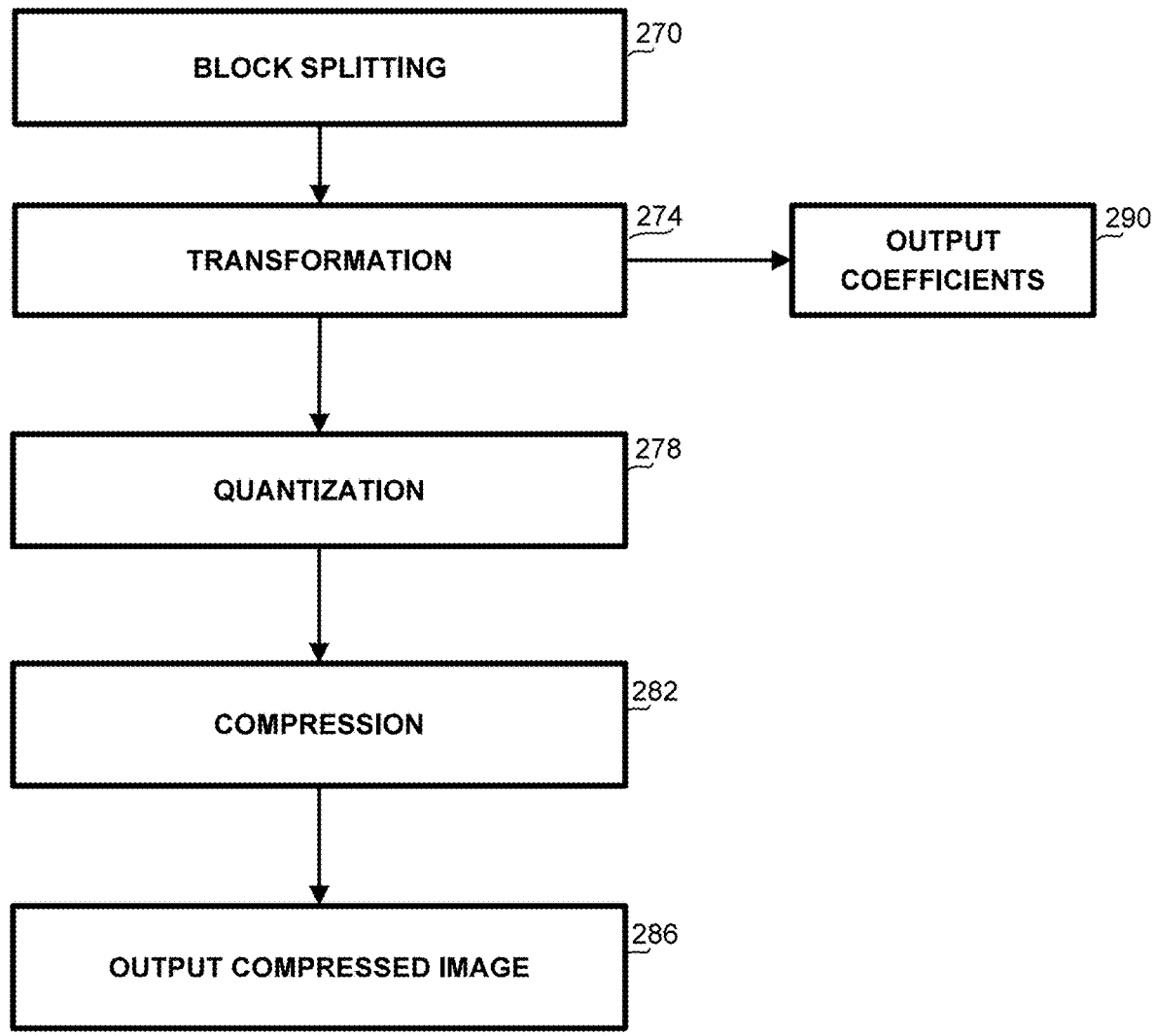
FIG. 2B is a flowchart of a method for JPEG compression, in accordance with some embodiments of the disclosure.

For clarity, referring now to FIG. 2B, showing a flowchart of a method for JPEG compression of monochrome images, in accordance with the disclosure.

In block splitting step 270, an image may be split into blocks (e.g., blocks of 8×8, 16×16, 32×32 or other arrangements of pixels).

In transformation step 274, each block may be transformed, e.g., by Discrete Cosine Transform (DCT) for JPEG compression, or other transformations for further compressions.

In quantization step 278, the transformed coefficients may be quantized using a quantization matrix that may relate to the human eye sensitivity, thereby many coefficients become zero.

In compression step 282, the quantized coefficients may be coded using data compression coding, e.g., Huffman coding, possibly with additional algorithmic processes, aimed at reducing the final size of the coded file. Compression may add a header to the compressed image, which may include parameters to be used by the decompression.

In output step 286 the compressed image may be output.

The steps detailed above describe a standard JPEG compression method. In accordance with the disclosure, step 290 may be performed as soon as coefficients are available, in which the coefficients may be output, for example for classification purposes. The coefficients may be output prior to compression step 282, or even prior to quantization step 278.

Figure 3:
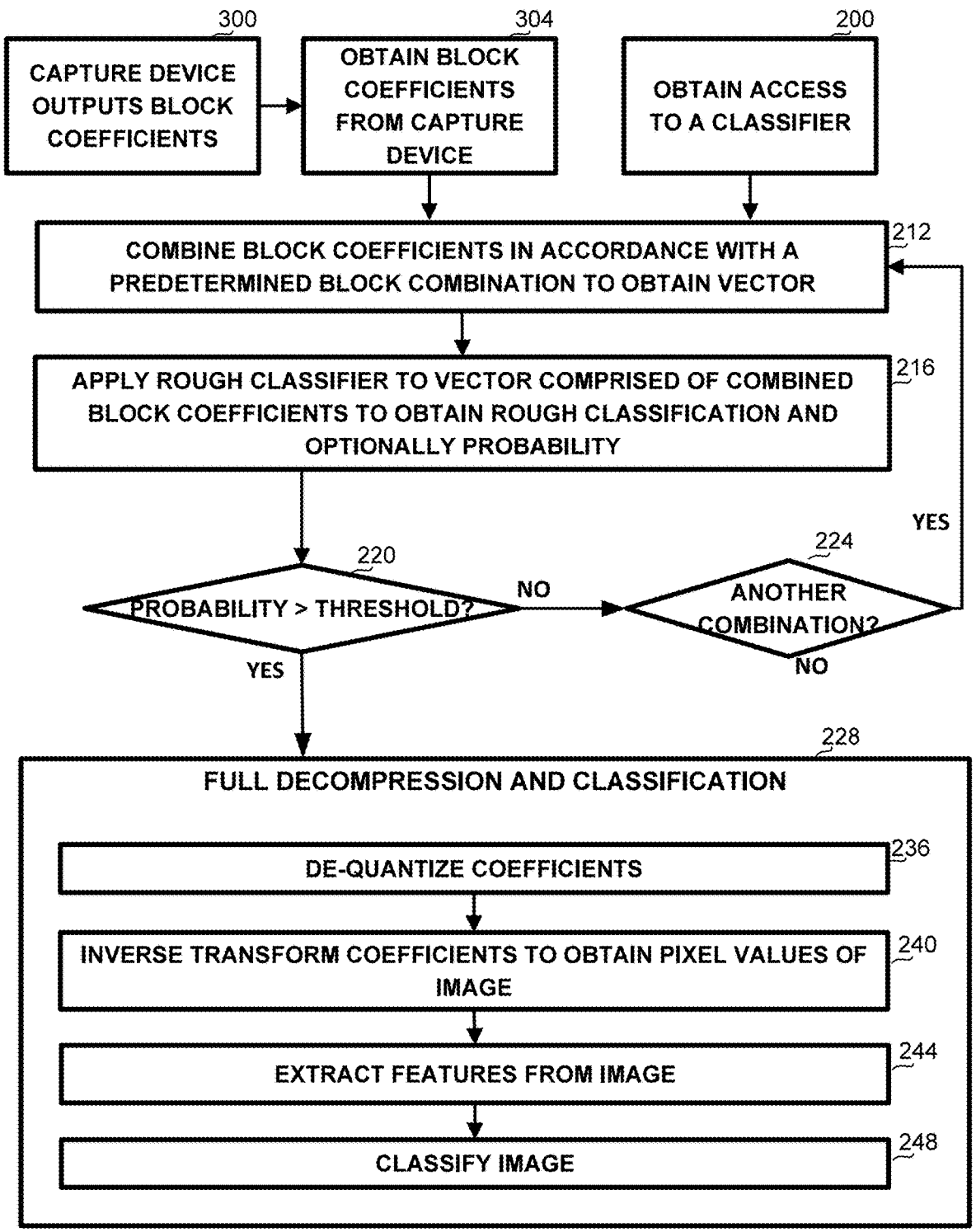
FIG. 3 is a generalized flowchart of another method for classifying compressed images, in accordance with some embodiments of the disclosure.

Referring now to FIG. 3, showing a flowchart of another embodiment of a method for efficient image classification. The steps of FIG. 3 may be performed by the modules of FIG. 1.

On step 300, an image capture device, such as capture device 100 may capture one or more images, and may compress the one or more images, for example using JPEG compression. The capture device may also output the compression coefficients.

On step 304, the coefficients as output by the capture device, for example in step 290 of FIG. 2B, may be received by CPMU 104. Thus, step 304 is alternative to steps 204 and 208 of FIG. 2, of obtaining a compressed image and decoding the image to obtain the block coefficients. Once the block coefficients are obtained, in this case from the capture device, execution may proceed on step 212 and on, as described in association with FIG. 2 above.

Experimental Results

Figure 4:
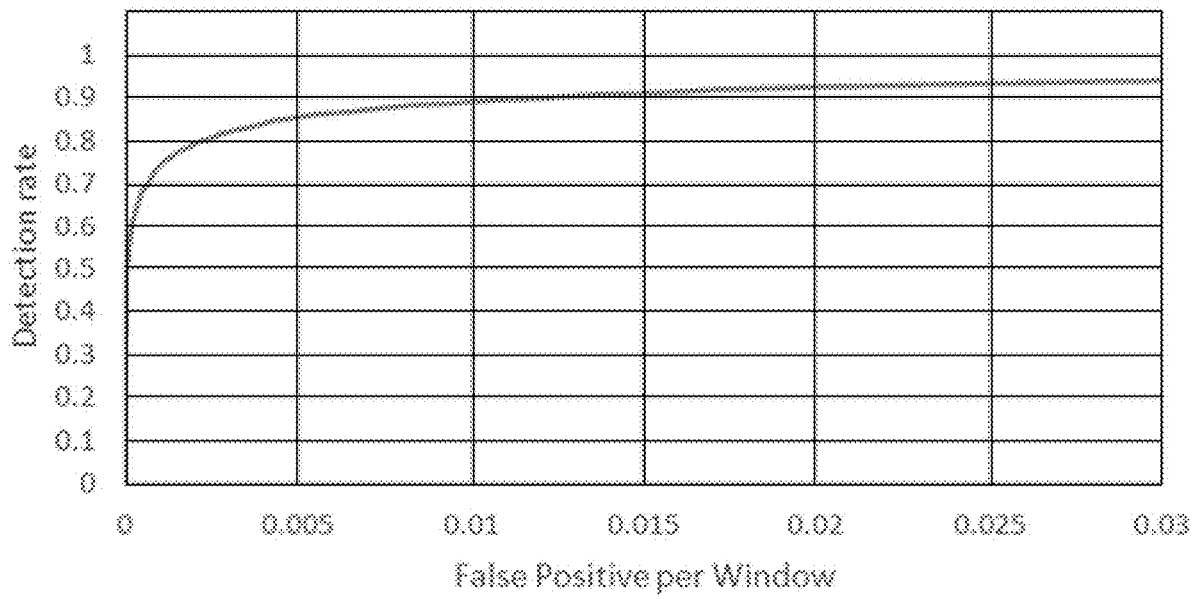
FIG. 4 is an exemplary graph of the Receiver Operating Characteristic (ROC) curve of a capture and processing device, in accordance with some exemplary embodiments of the disclosed subject matter.

In an exemplary embodiment, a boosted-trees frontal-face classifier has been trained on JPEG features. Training was done on the publicly available WIDER dataset. The positive dataset, i.e. images in which a face was captured, consisted of 8,500 frontal face samples, and the negative dataset, i.e. images in which no face is captured consisted of 80,000 samples. Of the negative samples, 70,000 were collected randomly from the WIDER dataset, whereas the remaining 10,000 were hard negative samples, i.e. samples that were falsely identified in a preliminary run. These were collected by running an initially-trained classifier on a set of negative images and then collecting those samples that were wrongly classified as frontal faces. The boosted-trees classifier, trained using the OpenCV library, had 512 trees with depth of 4. The classifier was tested on a set of 46,000 positive samples and 2,500 negative images that were scanned exhaustively. The classifier trained for the purpose of the experiment of FIG. 4 operates with a window size of 48 pixels×56 pixels. FIG. 4 shows the resulting Receiver Operating Characteristic Curve (ROC), which demonstrates the detection rate, i.e. the part of the images in which captured faces were correctly recognized vs. the false positive, i.e. the part of cases in which faces were not captured in an image, but have been falsely recognized. It is seen that with even a small percentage, for example 0.005, allowed false alarm rate provides detection rate of about 85%, while accepting 3% false alarms provide for about 95% detection rate.

The detection in FIG. 4 is specific to a given block combination within an image. For example, an image may contain five faces having five different sizes and appearing in different positions within the original image, and it may be required to detect all of them.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including wired or wireless local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for classifying an image, comprising:
    obtaining access to a classifier trained upon a multiplicity of sets of decoded coefficients;
    obtaining, by partially decompressing a compressed version of the image, one or more sets of first block coefficients associated with one or more first image blocks of a plurality of image blocks, each image block of the plurality of image blocks representing a respective region of the image, wherein each set of first block coefficients of the one or more sets of first block coefficients is associated with a respective first image block of the one or more first image blocks;
    applying the classifier to the one or more sets of first block coefficients to obtain a classification of the compressed version of the image and a probability of the compressed version of the image meeting the classification; and
    selectively obtaining, from the compressed version of the image, one or more sets of second block coefficients associated with one or more second image blocks of the plurality of image blocks based at least in part on the probability of the compressed version of the image meeting the classification.

2. The method of claim 1, wherein the one or more sets of first block coefficients is received from a capture device configured for:
    capturing the image;
    dividing the image into the plurality of image blocks;
    compressing the image to determine a respective set of block coefficients for each image block of the plurality of image blocks; and
    outputting the set of block coefficients for at least one first image block included in the one or more first image blocks no later than the image is fully compressed, wherein the one or more first image blocks are a subset of the plurality of image blocks.

3. The method of claim 1, wherein partially decompressing the compressed version of the image and applying the classifier to the one or more sets of first block coefficients takes at most 50% of processing steps required for full decompression and classification of the compressed version of the image.

4. The method of claim 1, wherein partially decompressing the compressed version of the image and applying the classifier to the one or more sets of first block coefficients takes at most 10% of processing steps required for full decompression and classification of the compressed version of the image.

5. The method of claim 1, wherein partially decompressing the compressed version of the image and applying the classifier to the one or more sets of first block coefficients is performed in hardware.

6. The method of claim 1, wherein the method is used for security or privacy protection purposes.

7. The method of claim 1, wherein the compressed version of the image is a Joint Photographic Experts Group (JPEG) image.

8. A device comprising:
an image capture device for capturing an image;
a memory device for storing a compressed image being the image as compressed; and
a processor, executing:
obtaining access to a classifier trained upon a multiplicity of sets of decoded coefficients;
obtaining, by partially decompressing the compressed image, one or more sets of first block coefficients associated with one or more first image blocks of a plurality of image blocks, each image block of the plurality of image blocks representing a respective region of the image, wherein each set of first block coefficients of the one or more sets of first block coefficients is associated with a respective first image block of the one or more first image blocks;
applying the classifier to the one or more sets of first block coefficients to obtain a classification of the compressed image and a probability of the compressed image meeting the classification; and
selectively obtaining, from the compressed image, one or more sets of second block coefficients associated with one or more second image blocks of the plurality of image blocks based at least in part on the probability of the compressed image meeting the classification.

9. The device of claim 8, wherein the one or more sets of first block coefficients is received from the image capture device, wherein the image capture device is configured for:
capturing the image;
dividing the image into the plurality of image blocks;
compressing the image to determine a respective set of block coefficients for each image block of the plurality of image blocks; and
outputting the set of block coefficients for at least one first image block included in the one or more first image blocks no later than the image is fully compressed, wherein the one or more first image blocks are a subset of the plurality of image blocks.

10. The device of claim 8, wherein partially decompressing the compressed image and applying the classifier to the one or more sets of first block coefficients takes at most 10% of the processing steps required for full decompression and classification of the compressed image.

11. The device of claim 8, wherein the compressed image is a Joint Photographic Experts Group (JPEG) image.

12. A computer program product comprising a non-transitory computer readable storage medium retaining program instructions, which program instructions when read by a processor, cause the processor to perform a method comprising:
obtaining access to a classifier trained upon a multiplicity of sets of decoded coefficients;
obtaining, by partially decompressing a compressed version of an image, one or more sets of first block coefficients associated with one or more first image blocks of a plurality of image blocks, each image block of the plurality of image blocks representing a respective region of the image, wherein each set of first block coefficients of the one or more sets of first block coefficients is associated with a respective first image block of the one or more first image blocks; and
applying the classifier to the one or more sets of first block coefficients to obtain a classification of the compressed version of the image and a probability of the compressed version of the image meeting the classification; and
selectively obtaining, from the compressed version of the image, one or more sets of second block coefficients associated with one or more second image blocks of the plurality of image blocks based at least in part on the probability of the compressed version of the image meeting the classification.

\* \* \* \* \*